UNITED STATES PATENT OFFICE.

HEINRICH JACOB GOLDSCHMIDT, OF CHRISTIANIA, NORWAY, ASSIGNOR TO DET NORSKE AKTIESELSKAB FOR ELEKTROKEMISK INDUSTRI, NORSK INDUSTRI-HYPOTEKBANK, OF CHRISTIANIA, NORWAY.

PROCESS OF PRODUCING ALUMINIUM COMPOUNDS.

1,354,824.      Specification of Letters Patent.      Patented Oct. 5, 1920.

No Drawing.      Application filed March 19, 1917. Serial No. 155,882.

*To all whom it may concern:*

Be it known that I, HEINRICH JACOB GOLDSCHMIDT, a subject of the King of Norway, residing at Christiania, in the Kingdom of Norway, have invented certain new and useful Improvements in the Process of Producing Aluminium Compounds; and I do hereby declare the following to be a full, clear, and exact description of the invention, such as will enable others skilled in the art to which it appertains to make and use the same.

My invention relates to the manufacture of aluminium compounds from substances containing besides aluminium other metals, such as potassium, sodium, calcium, etc., and has for its object a process for the recovery of aluminium compounds therefrom.

My process broadly contemplates decomposing the rocks or minerals with nitric acid, subjecting the decomposition product containing the resultant nitrates to heat whereby the aluminium nitrate is decomposed and converted to aluminium oxid, the other nitrates present being unaffected, and recovering the aluminium oxid by washing and filtration or other suitable means.

Aluminium nitrate containing water of crystallization begins to decompose at about 140° C. giving off oxids of nitrogen; and at about 300° C. the decomposition into $Al_2O_3$ and oxids of nitrogen is complete. The nitrates of potassium, sodium, calcium, etc., are not affected at this temperature by reason of which fact the $Al_2O_3$ may be readily separated from the soluble nitrates of the decomposition mass by lixiviation. The aluminium oxid thus formed permits of easy filtration and differs from the gelatinous precipitate obtained according to the usual precipitation methods.

Where iron is present in the initial material and ferric nitrate is formed, the iron may be eliminated from the final product by several methods; for example, (*a*) By a preliminary heating of the decomposition product to about 150° C. and maintaining this temperature until the ferric nitrate is decomposed and the iron converted into insoluble compounds from which the soluble nitrates can be separated by well-known methods;

(*b*) By omitting the preliminary removal of the iron and subjecting the aluminium oxid and iron oxid, formed at about 300° C. as above specified, to the action of an acid which dissolves the combined iron but does not affect the aluminium oxid.

The oxids of nitrogen escaping during the decomposition process may be readily absorbed and utilized for the production of nitric acid, which may be used again in the process.

The above described method of separating aluminium from calcium, potassium, sodium, etc., is very suitable for the production of alumina from minerals rich in plagioclases particularly of the labradorite-anorthosite series.

In carrying out my process with this mineral, the same is treated with nitric acid of suitable concentration and the nitrates recovered from the resultant solution by evaporation or crystallization. These nitrates are then heated to about 300° C. and the resultant product lixiviated, whereupon aluminium oxid is recovered by filtration. The nitrates remaining in the filtrate may be recovered therefrom either singly or together for use as fertilizers or for other purposes. The oxids of nitrogen given off when the nitrates are heated can be absorbed and nitric acid formed, the concentration of which depends upon whether the nitrates heated are in a moist or dry condition.

It is obvious that the practical execution of the process may be modified in various manners. Thus the decomposition may in some instances generally be carried into effect under a reduced pressure.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. The process of producing aluminium oxid from materials containing aluminium and other metals, which comprises treating the material with nitric acid, and subjecting the nitrates thus formed to such a temperature as to convert the aluminium nitrate to aluminium oxid while leaving the remaining nitrates unaffected.

2. The process of producing aluminium oxid from materials containing aluminium and other metals and recovering the same, which comprises treating the material with nitric acid, subjecting the nitrates thus formed to such a temperature as to convert the aluminium nitrate to aluminium oxid while leaving the remaining nitrates unaffected, and lixiviating the resultant product.

3. The process of producing aluminium oxid from materials containing combined aluminium, calcium, sodium and potassium, which comprises treating the material with nitric acid, subjecting the nitrates thus formed to such a temperature as to convert the aluminium nitrate to aluminium oxid while leaving the remaining nitrates unaffected.

4. The process of producing aluminium oxid from minerals containing aluminium and other metals including iron and recovering the aluminium oxid, which comprises subjecting the mineral to nitric acid, heating the nitrates thus formed, removing the resultant combined iron, and recovering the aluminium oxid by lixiviation, the temperature employed being substantially no higher than is required to convert the aluminium nitrate to aluminium oxid.

5. The process of producing aluminium oxid from materials containing aluminium and other metals including iron and recovering the aluminium oxid, which comprises subjecting the material to nitric acid, heating the nitrates thus formed to a temperature such as to convert the ferric nitrates to ferric oxid and removing the ferric oxid, heating the remaining nitrates to such a temperature as to convert the aluminium nitrate to aluminium oxid while leaving the remaining nitrates unaffected and recovering the aluminium oxid from the resultant product by lixiviation.

6. The process of producing aluminium oxid from materials containing aluminium and other metals, which comprises treating the materials with nitric acid, and heating the nitrates thus formed to about 300° C., whereby the aluminium nitrate is converted to aluminium oxid and the remaining nitrates are undecomposed.

7. The process of producing aluminium oxid from minerals rich in plagioclases which comprises treating the minerals with nitric acid, driving off the water of crystallization, heating the nitrates to about 300° C. and recovering the aluminium oxid thus produced by lixiviation.

In testimony that I claim the foregoing as my invention, I have signed my name in presence of two subscribing witnesses.

HEINRICH JACOB GOLDSCHMIDT.

Witnesses:
C. VORMAN,
KARL L. LEE.